United States Patent
LiPiShan et al.

(10) Patent No.: US 10,160,819 B2
(45) Date of Patent: *Dec. 25, 2018

(54) ETHYLENE/ALPHA-OLEFIN/POLYENE BASED COMPOSITIONS

(71) Applicant: Dow Global Technologies LLC, Midland, MI (US)

(72) Inventors: Colin LiPiShan, Pearland, TX (US); Timothy E. Clayfield, Waedenswil (CH); Sonja M. Delatte, Denham Springs, LA (US)

(73) Assignee: Dow Global Technologies LLC, Midland, MI (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/434,208

(22) PCT Filed: Mar. 15, 2013

(86) PCT No.: PCT/US2013/032480
§ 371 (c)(1),
(2) Date: Apr. 8, 2015

(87) PCT Pub. No.: WO2014/084893
PCT Pub. Date: Jun. 5, 2014

(65) Prior Publication Data
US 2015/0274867 A1    Oct. 1, 2015

Related U.S. Application Data

(60) Provisional application No. 61/731,891, filed on Nov. 30, 2012.

(51) Int. Cl.
| | | |
|---|---|---|
| *C08F 210/18* | (2006.01) | |
| *C08L 23/16* | (2006.01) | |
| *C08F 4/659* | (2006.01) | |

(52) U.S. Cl.
CPC ............ *C08F 210/18* (2013.01); *C08L 23/16* (2013.01); *C08F 4/65908* (2013.01); *C08F 4/65912* (2013.01); *C08L 2205/025* (2013.01); *C08L 2308/00* (2013.01); *Y10T 428/139* (2015.01)

(58) Field of Classification Search
CPC ........... C08F 210/18; C08L 23/16; C08J 9/00; C08J 2323/16
See application file for complete search history.

(56) References Cited

U.S. PATENT DOCUMENTS

| | | |
|---|---|---|
| 8,178,031 B2 | 5/2012 | Jacob et al. |
| 2006/0183631 A1 | 8/2006 | Lee et al. |
| 2015/0210838 A1 | 7/2015 | Wu et al. |
| 2015/0259491 A1 | 9/2015 | LiPiShan et al. |

FOREIGN PATENT DOCUMENTS

| | | | |
|---|---|---|---|
| EP | 0718324 A2 | 6/1996 | |
| EP | 0751182 | 1/1997 | |
| EP | 1433812 A1 | 6/2004 | |
| JP | 2004035813 A | 2/2004 | |
| JP | 04132672 B2 | 8/2008 | |
| WO | 2000/026268 A1 | 5/2000 | |
| WO | 2006/009976 A1 | 1/2006 | |
| WO | 2007/136494 A2 | 11/2007 | |
| WO | 2010/033601 A1 | 3/2010 | |
| WO | 2011/008837 A1 | 1/2011 | |
| WO | WO 2011008837 A1 * | 1/2011 | ............ C08F 297/06 |
| WO | 2011041230 A1 | 4/2011 | |
| WO | 2011065877 A1 | 6/2011 | |
| WO | 2011163173 A1 | 12/2011 | |
| WO | 2012027448 A1 | 3/2012 | |
| WO | 2012092491 A2 | 7/2012 | |

OTHER PUBLICATIONS

PCT/US2013/032480, Jul. 29, 2013, International Search Report and Written Opinion.
PCT/US2013/032480, Jun. 2, 2015, International Preliminary Report on Patentability.

* cited by examiner

*Primary Examiner* — Kara B Boyle
(74) *Attorney, Agent, or Firm* — Husch Blackwell LLP

(57) ABSTRACT

The invention provides a composition comprising a first composition that comprises at least one ethylene/alpha-olefin/nonconjugated polyene interpolymer; and wherein the first composition has a Mooney Viscosity (ML1+4, 125C) greater than, or equal to, 10, and wherein the first composition has a "13C NMR % Peak Area," which is the {[(13C NMR peak area from 21.3 ppm to 21.8 ppm) divided by the (total integral area from 19.5 ppm to 22.0 ppm)]×100}, that is greater than 3.5 percent, as determined by 13C NMR.

17 Claims, 1 Drawing Sheet

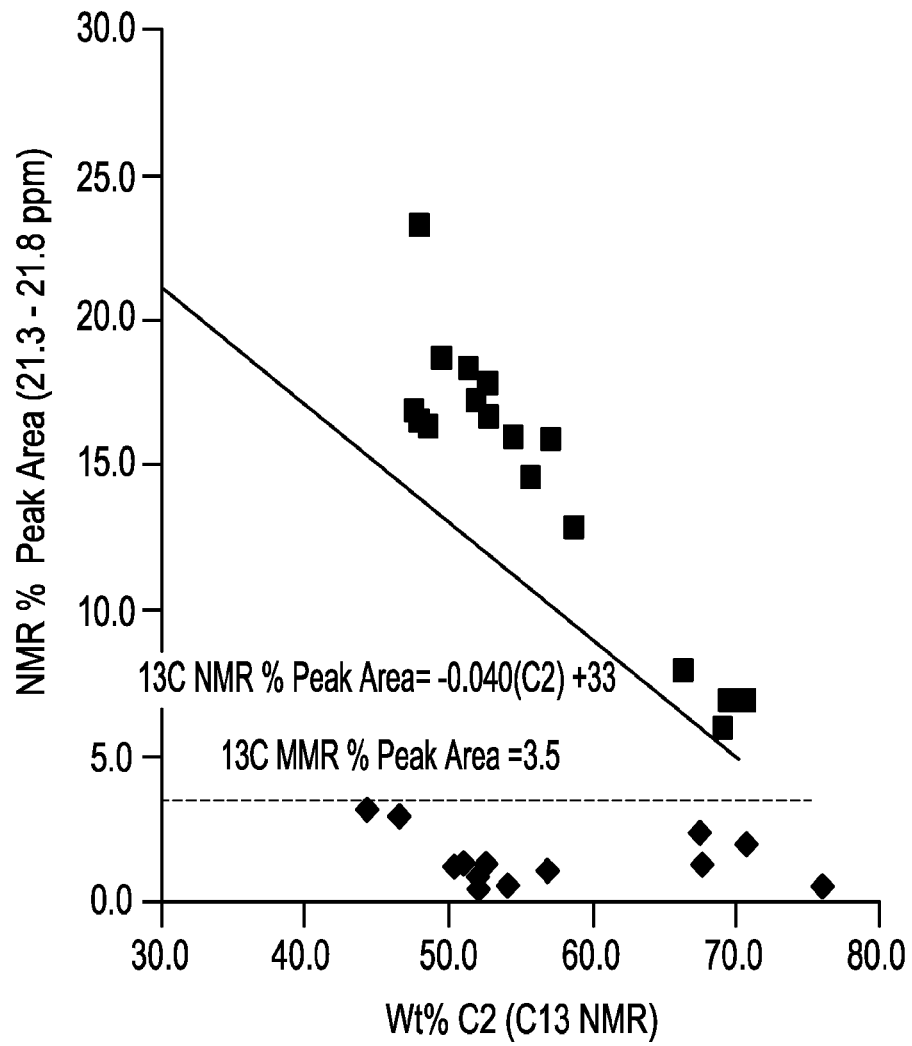

ETHYLENE/ALPHA-OLEFIN/POLYENE BASED COMPOSITIONS

REFERENCE TO RELATED APPLICATIONS

This application claims the benefit of U.S. Application No. 61/731,891, filed on Nov. 30, 2012.

BACKGROUND OF THE INVENTION

There is a need for new compositions containing ethylene/alpha-olefin/nonconjugated polyene interpolymers that can be used for vulcanized rubber compositions, and provide improved mixing and processibility, improved mechanical properties, and improved product consistency.

WO 2007/136494 disclosed ethylene/alpha-olefin/diene polymers prepared from a catalyst composition comprising a zirconium complex of a polyvalent aryloxyether. WO 2006/009976 discloses processes for preparing polyolefins in the presence of a perfluorocarbon or hydrofluorocarbon with an activated, nonmetallocene, metal-centered, heteroaryl ligand catalyst.

Rubber compositions are also disclosed in the following: WO2011/008837, WO2012/092491, US20060183631, WO2011/163176, EP1433812A1, WO2011/041230, WO2006/009976, WO2000/26268, U.S. Pat. No. 8,178,031, EP751182A1, EP718324A1, WO2011/0065877, JP04132672B2 (abstract), JP2004035813 (abstract), EP1433812A1.

However, as discussed above, there is a need for new polymer compositions containing ethylene/alpha-olefin/nonconjugated polyene interpolymers that can be used for vulcanized rubber compositions, and provide improved mixing and processibility and improved mechanical properties, and improved product consistency.

SUMMARY OF THE INVENTION

The invention provides a composition comprising a first composition that comprises at least one ethylene/alpha-olefin/nonconjugated polyene interpolymer; and
   wherein the first composition has a Mooney Viscosity (ML1+4, 125° C.) greater than, or equal to, 10, and
   wherein the first composition has a "13C NMR % Peak Area," which is the {[(13C NMR peak area from 21.3 ppm to 21.8 ppm) divided by the (total integral area from 19.5 ppm to 22.0 ppm)]×100}, that is greater than 3.5 percent, as determined by 13C NMR.

BRIEF DESCRIPTION OF THE FIGURES

FIG. 1 depicts a plot of "13C NMR % Peak Area" versus "weight percent C2 (13C NMR)" for several inventive (first composition) and comparative compositions.

DETAILED DESCRIPTION OF THE INVENTION

As discussed above, the invention provides a composition comprising a first composition that comprises at least one ethylene/alpha-olefin/nonconjugated polyene interpolymer; and
   wherein the first composition has a Mooney Viscosity (ML1+4, 125° C.) greater than, equal to 10, and
   wherein the first composition has a "13C NMR % Peak Area," which is the {[(13C NMR peak area from 21.3 ppm to 21.8 ppm) divided by the (total integral area from 19.5 ppm to 22.0 ppm)]×100}, that is greater than 3.5 percent, as determined by 13C NMR.

The inventive composition may comprise a combination of two or more embodiments described herein.

The first composition may comprise a combination of two or more embodiments described herein.

The ethylene/alpha-olefin/nonconjugated polyene interpolymer may comprise a combination of two or more embodiments described herein.

In one embodiment, the first composition has a "13C NMR % Peak Area," which is the {[(13C NMR peak area from 21.3 ppm to 21.8 ppm) divided by the (total integral area from 19.5 ppm to 22.0 ppm)]×100}, that is greater than, or equal to, 4.0 percent, further greater than, or equal 5.0 percent, as determined by 13C NMR.

In one embodiment, the first composition has a "13C NMR % Peak Area," which is the {[(13C NMR peak area from 21.3 ppm to 21.8 ppm) divided by the (total integral area from 19.5 ppm to 22.0 ppm)]×100}, that is greater than, or equal to, 6.0 percent, further greater than, or equal 7.0 percent, as determined by 13C NMR.

In one embodiment, the first composition has a "13C NMR % Peak Area," which is the {[(13C NMR peak area from 21.3 ppm to 21.8 ppm) divided by the (total integral area from 19.5 ppm to 22.0 ppm)]×100}, that is greater than, or equal to, 8.0 percent, further greater than, or equal 9.0 percent, further greater than, or equal 10.0 percent, as determined by 13C NMR.

In one embodiment, the first composition has a "13C NMR % Peak Area," which is the {[(13C NMR peak area from 21.3 ppm to 21.8 ppm) divided by the (total integral area from 19.5 ppm to 22.0 ppm)]×100}, that is greater than, or equal to, 12.0 percent, further greater than, or equal 14.0 percent, further greater than, or equal 16.0 percent, as determined by 13C NMR.

In one embodiment, the first composition comprises greater than, or equal to, 90 weight percent, further greater than, or equal to, 95 weight percent, further greater than, or equal to, 98 weight percent, of the ethylene/alpha-olefin/nonconjugated polyene interpolymer, based on the weight of the first composition.

In one embodiment, the first composition comprises greater than, or equal to, 30 weight percent, further greater than, or equal to, 40 weight percent, further greater than, or equal to, 50 weight percent, of the ethylene/alpha-olefin/nonconjugated polyene interpolymer, based on the weight of the first composition.

In one embodiment, the first composition further comprises a second ethylene/alpha-olefin/nonconjugated polyene interpolymer. In a further embodiment, the first composition comprises greater than, or equal to, 90 weight percent, further greater than, or equal to, 95 weight percent, further greater than, or equal to, 98 weight percent, of the sum weight of the second ethylene/alpha-olefin/nonconjugated polyene interpolymer and the ethylene/alpha-olefin/nonconjugated polyene interpolymer, based on the weight of the first composition.

In one embodiment, the first composition further comprises a second ethylene/alpha-olefin/nonconjugated polyene interpolymer. In a further embodiment, the first composition comprises greater than, or equal to, 30 weight percent, further greater than, or equal to, 40 weight percent, further greater than, or equal to, 50 weight percent, of the sum weight of the second ethylene/alpha-olefin/nonconjugated polyene interpolymer and the ethylene/alpha-olefin/nonconjugated polyene interpolymer, based on the weight of the first composition.

In one embodiment, the first composition meets the following relationship: 13C NMR % Peak Area≥−0.40(C2)+ 33%; wherein the "13C NMR % Peak Area," is the {[(13C NMR peak area from 21.3 ppm to 21.8 ppm) divided by the (total integral area from 19.5 ppm to 22.0 ppm)]×100}, as determined by 13C NMR; and the "C2" is the weight percent of polymerized ethylene in the first composition, based on the weight of the first composition.

In one embodiment, the first composition comprises from 40 to 80 weight percent ethylene, further from 45 to 75 weight percent ethylene, based on the weight of first composition.

In one embodiment, the first composition comprises from 0.5 to 15 weight percent, further from 0.5 to 12 weight percent, further from 0.5 to 10 weight percent, further from 0.5 to 8 weight percent, further from 0.5 to 6 weight percent of the polyene, based on the weight of first composition. In a further embodiment, the polyene is a diene, and further ENB.

In one embodiment, the first composition has a viscosity at 0.1 rad/sec, 190° C., greater than, or equal to, 40,000 Pa·s, further greater than, or equal to, 45,000 Pa·s, further greater than, or equal to, 50,000 Pa·s.

In one embodiment, the first composition has a Mooney Viscosity greater than, or equal to, 15, further greater than, or equal to, 20 (ML 1+4, 125° C.).

In one embodiment, the first composition has a Mooney Viscosity greater than, or equal to, 30, further greater than, or equal to, 40 (ML 1+4, 125° C.).

In one embodiment, the first composition has a Mooney Viscosity greater than, or equal to, 50, further greater than, or equal to, 60, further greater than, or equal to, 70 (ML 1+4, 125° C.).

In one embodiment, the first composition has a Mooney Viscosity from 15 to 100, further from 20 to 80 (ML 1+4, 125° C.).

In one embodiment, the first composition has a MWD less than, or equal to, 4.0, further less than, or equal to, 3.5, further less than, or equal to, 3.0.

In one embodiment, the first composition has a MWD greater than, or equal to, 2.0, further greater than, or equal to, 2.1.

In one embodiment, the first composition has a rheology ratio (V0.1/V100 at 190° C.) greater than, or equal to, 20, further greater than, or equal to, 23, and further greater than, or equal to, 25.

In one embodiment, the first composition has a rheology ratio (V0.1/V100 at 190° C.) from 20 to 50, further from 22 to 45, further from 25 to 40.

In one embodiment, the first composition has a viscosity at 0.1 rad/sec, 190° C., from 30,000 to 130,000 Pa·s, further from 35,000 to 125,000 Pa·s, further from 40,000 to 120,000 Pa·s.

In one embodiment, the first composition has a weight average molecular weight (Mw) less than, or equal to, 350,000 g/mole, further less than, or equal to, 300,000 g/mole, further less than, or equal to, 250,000 g/mole.

In one embodiment, the first composition has a weight average molecular weight (Mw) from 50,000 to 350,000 g/mole, further from 60,000 to 300,000 g/mole, further from 70,000 to 250,000 g/mole.

In one embodiment, the first composition has a tan delta (0.1 rad/sec, 190° C.) from 0.70 to 1.90, further from 0.75 to 1.80, further from 0.77 to 1.70.

In one embodiment, the first composition has a tan delta (0.1 rad/sec, 190° C.) from 1.00 to 1.90, further from 1.10 to 1.80.

In one embodiment, the first composition comprises from 40 to 90 weight percent ethylene, further from 50 to 90 weight percent ethylene, further from 55 to 85 weight percent ethylene, and further from 60 to 80 weight percent ethylene, based on the weight of the first composition.

In one embodiment, the first composition is present in an amount greater than, or equal to, 20 weight percent, further greater than, or equal to, 30 weight percent, and further greater than, or equal to, 40 weight percent, based on the weight of the composition.

The first composition may comprise a combination of two or more embodiments described herein.

The ethylene/alpha-olefin/nonconjugated polyene interpolymer may comprise a combination of two or more embodiments described herein.

In one embodiment, the ethylene/α-olefin/nonconjugated polyene interpolymer is an ethylene/α-olefin/diene interpolymer (EAODM). In a further embodiment, the interpolymer is an ethylene/propylene/diene terpolymer (EPDM). In a further embodiment, the diene is 5-ethylidene-2-norbornene (ENB).

In one embodiment, the ethylene/alpha-olefin/nonconjugated polyene interpolymer has a rheology ratio (V0.1/V100 at 190° C.) greater than, or equal to, 20, further greater than, or equal to, 30, further greater than, or equal to, 40, further greater than, or equal to, 50. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/alpha-olefin/nonconjugated polyene interpolymer has a rheology ratio (V0.1/V100 at 190° C.) from 20 to 80, further from 30 to 70, further from 40 to 60. In a further embodiment, the interpolymer is an EAODM, and further an ethylene/propylene/diene (EPDM) terpolymer. In a further embodiment, the diene is 5-ethylidene-2-norbornene (ENB).

The rheology ratio (V0.1/V100 at 190° C.) of the ethylene/α-olefin/nonconjugated polyene interpolymer is that of the neat polymer (no oil, no filler). The polymer may be stabilized with "ppm amounts" of one or more antioxidants and/or other stabilizers.

In one embodiment, the ethylene/α-olefin/nonconjugated polyene has a viscosity at 0.1 rad/sec, 190° C., from 120,000 to 200,000 Pa·s, further from 130,000 to 190,000 Pa·s. further from 140,000 to 180,000 Pa·s. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer comprises from 3.0 to 12.0 weight percent polyene, further from 4.0 to 10.0 weight percent polyene, and further from 5.0 to 7.0 weight percent polyene, based on the weight of the interpolymer. In a further embodiment, the polyene is a diene. In a further embodiment, the diene is 5-ethylidene-2-norbornene (ENB).

In one embodiment, the ethylene/α-olefin/nonconjugated polyene interpolymer has a Mooney Viscosity greater than, or equal to, 30, further greater than, or equal to, 35, further greater than, or equal to, 40 (ML 1+4, 125° C.). Mooney viscosity is that of the neat polymer (no oil, no filler). The polymer may be stabilized with "ppm amounts" of one or more antioxidants and/or other stabilizers. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a MWD less than, or equal to, 3.5, further less than, or equal to 3.0, further less than, or equal to 2.5. In a further embodiment, the interpolymer is an EAODM, further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a MWD greater than, or equal to, 1.2, further greater than, or equal to 1.5, further greater than, or equal to 1.8. In a further embodiment, the interpolymer is an EAODM, further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a MWD greater than, or equal to, 1.7, further greater than, or equal to 2.0, further greater than, or equal to 2.2. In a further embodiment, the interpolymer is an EAODM, further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a weight average molecular weight (Mw) less than, or equal to, 400,000 g/mole, further less than, or equal to, 300,000 g/mole, further less than, or equal to, 200,000 g/mole. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer has a weight average molecular weight (Mw) from 80,000 to 300,000 g/mole, further from 100,000 to 200,000 g/mole. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer comprises from 40 to 90 weight percent ethylene, further from 50 to 90 weight percent ethylene, further from 55 to 85 weight percent ethylene, and further from 60 to 80 weight percent ethylene, based on the weight of the interpolymer. In a further embodiment, the interpolymer is an EAODM, and further an ethylene/propylene/diene (EPDM) terpolymer. In a further embodiment, the diene is 5-ethylidene-2-norbornene (ENB).

In one embodiment, the ethylene/α-olefin/nonconjugated polyene interpolymer is present in an amount greater than, or equal to, 20 weight percent, further greater than, or equal to 30 weight percent, and further greater than, or equal to 40 weight percent, based on the weight of the composition. In a further embodiment, the interpolymer is an EAODM, further an ethylene/propylene/diene (EPDM) terpolymer. In a further embodiment, the diene is 5-ethylidene-2-norbornene (ENB).

The ethylene/α-olefin/nonconjugated polyene interpolymer, further an EAODM, and further an EPDM, may comprise a combination of two or more embodiments as described herein.

In one embodiment, the composition further comprises a crosslinking agent.

In one embodiment, the composition further comprises an oil.

In one embodiment, an inventive composition further comprises a filler. Suitable fillers include, but are not limited to, clay, CaCO3, talc, carbon black, and mineral fibers.

In one embodiment, the filler is present in an amount from 5 to 30 weight percent, based on the weight of the composition.

In one embodiment, an inventive composition further comprises at least one stabilizer. Suitable stabilizers include, but are not limited to, AO and UV stabilizers.

The inventive composition may comprise a combination of two or more embodiments described herein.

The invention also provides a crosslinked composition formed from an inventive composition of one or more embodiments described herein.

The invention also provides an article comprising at least one component formed from an inventive composition of one or more embodiments described herein. In a further embodiment, the article is selected from the group consisting of profiles, injection molded parts, gaskets, automotive parts, building and construction materials, shoe components, and tubes.

In one embodiment, the article is an automotive part.

The invention also provides an article comprising at least one component formed from a crosslinked composition of one or more embodiments described herein. In a further embodiment, the article is selected from the group consisting of profiles, injection molded parts, gaskets, automotive parts, building and construction materials, shoe components, and tubes.

The inventive composition may comprise a combination of two or more embodiments described herein.

An inventive article may comprise a combination of two or more embodiments described herein.

Ethylene/α-Olefin/Nonconjugated Polyenes Interpolymers

The ethylene/α-olefin/nonconjugated polyene interpolymers (including the second ethylene/α-olefin/nonconjugated polyene interpolymers), for the inventive compositions described herein, comprise, in polymerize form, ethylene, an α-olefin, and a nonconjugated polyene. Suitable examples of α-olefins include the C3-C20 α-olefins, further C3-C10 α-olefins, and preferably propylene. Suitable examples of nonconjugated polyenes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, the interpolymer is an ethylene/propylene/-diene (EPDM) terpolymer. In a further embodiment, the diene is 5-ethylidene-2-norbornene (ENB).

Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the ethylene/α-olefin/nonconjugated polyene interpolymer comprises a majority amount of polymerized ethylene, based on the weight of the interpolymer. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

In one embodiment, the ethylene/α-olefin/nonconjugated polyene interpolymer has a molecular weight distribution (Mw/Mn) from 1.7 to 5.0, further from 1.8 to 4.0, further from 2.0 to 3.5, further from 2.0 to 3.0. In a further embodiment, the ethylene/α-olefin/nonconjugated polyene interpolymer is an ethylene/α-olefin/dene interpolymer (EAODM). In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., greater than, or equal to, 20, further greater than, or equal to, 30, further greater than or equal to 35. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., less than 100, or less than, or equal to, 80, or less than, or equal to, 60. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., from 20 to 100, or from 30 to 80, or from 35 to 60. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

In one embodiment, the ethylene/α-olefin/nonconjugated polyene interpolymer has a Mooney viscosity, ML(1+4) at 125° C., from 10 to 100, or from 15 to 90, or from 20 to 85. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

Mooney viscosity is that of the neat interpolymer (or calculated viscosity of neat polymer for polymers that contain a filler, such as carbon black, and/or an oil). The neat polymer refers to the polymer without filler and without oil.

An ethylene/alpha-olefin/nonconjugated polyene interpolymer may comprise a combination of two or more embodiments as described herein.

An ethylene/alpha-olefin/diene interpolymer may comprise a combination of two or more embodiments as described herein.

An EPDM terpolymer may comprise a combination of two or more embodiments as described herein.

Crosslinking Agents

Vulcanizing agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; metal oxides, such as zinc, magnesium, and lead oxides; dinitroso compounds, such as p-quinone-dioxime and p,p'-dibenzoylquinone-dioxime; and phenol-formaldehyde resins containing hydroxymethyl or halomethyl functional groups. The suitability of any of these vulcanizing agents for use in the invention will be largely governed by the choice of polymers, as is well known to those skilled in the compounding art. Sulfur can be a crystalline elemental sulfur or an amorphous elemental sulfur, and either type can be in pure form or supported on an inert carrier. An example of a supported sulfur is Rhenogran S-80 (80% S and 20% inert carrier) from Rhein Chemie.

In one embodiment of the invention, the sulfur containing compounds and the peroxides are the preferred vulcanizing agents, and the sulfur containing compounds are most preferred. It is understood that mixtures of these vulcanizing agents can be employed, though this is generally not preferred. The amount of the vulcanizing agent can range from about 1 to 10 parts by weight, based upon 100 parts of the polymers in the composition.

Vulcanization temperatures and time employed are typical. Temperatures ranging from about 250° F. to about 440° F., and times ranging from about one minute to about 120 minutes can be employed.

Additional crosslinking agents include, but are not limited to, phenolic resins, azides, aldehyde-amine reaction products, vinyl silanes, hydrosilylation, substituted ureas, substituted guanidines; substituted xanthates; substituted dithiocarbamates; and combinations thereof. See Encyclopedia of Chemical Technology, Vol. 17, 2nd edition, Interscience Publishers, 1968; also Organic Peroxides, Daniel Seem, Vol. 1, Wiley-Interscience, 1970), which are incorporated by reference herein in their entirety.

The crosslinking agent may be a phenolic curing agent or a peroxide curing agent, with an optional co-agent, or hydrosilylation cross-linking agent with a hydrosilylation catalyst, or dibutyl tin dilaurate ("DBTDL"), with an optional co-agent alumina trihydrate ("ATH"), for silane-grafted interpolymer. A phenolic resin and SnC12 is used for EPDM curing (peroxide, or sulfur or hydrosilation curing systems can also be used).

Suitable peroxides include, but are not limited to, aromatic dactyl peroxides; aliphatic dactyl peroxides; dibasic acid peroxides; ketene peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxode; tert-butyl-perbenzoate; tert-butyl-cumylperoxide; 2,5-bis (t-butylperoxy)-2,5-dimethylhexane; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene;1,1-bis-(t-butylperoxy)-3,3,5-trimethyl-cyclohexane; lauroyl peroxide; succinic acid peroxide; cyclohexanone peroxide; t-butyl peracetate; butyl hydroperoxide; and the like.

The vulcanizing elastomer may be grafted to a vinyl silane monomer in the presence of a low level of peroxide via a separate reactive extrusion process. Suitable vinyl silanes include, but are not limited to, vinyl trimethoxysilane, vinyl triethoxysilane. The grafted elastomer may then be reacted with water to cure the polymer in the presence of a catalyst such as dibutyl tin dilaurate during the dynamic vulcanization process. Suitable water sources include, but are not limited to, steam, water/ethylene glycol mixtures, aluminum trihydrate, and magnesium hydroxide. Either ethylene-alpha-olefin copolymers or ethylene-alpha-olefin-polyene terpolymers are suitable vulcanizing elastomers for this cure system.

Silicon hydride having at least two SiH groups in the molecule may be reacted with the carbon-carbon multiple bonds of the unsaturated rubber component in the presence of a hydrosilylation catalyst to form useful crosslinks during dynamic vulcanization. Suitable silicon hydride compounds include, but are not limited to, methylhydrogen polysiloxanes, methylhydrogen dimethyl-siloxane copolymers, methylhydrogen alkyl methyl polysiloxanes, bis(dimethylsilyl) alkanes and bis(dimethylsilyl)benzene. The amount of silicon hydride compound useful in the process of the composition can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer. Suitable catalysts for the hydrosilylation vulcanization reaction include transition metals of Group VIII such as palladium, rhodium, platinum and the like, including complexes of these metals. The use of hydrosilylation crosslinking to dynamically vulcanize EPDM to produce TPV's was disclosed in U.S. Pat. No. 6,251,998 (Medsker, et al., Jun. 26, 2001), which is incorporated by reference herein in its entirety.

A crosslinking agent may comprise a combination of two or more embodiments as described herein.

Oils

Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

In one embodiment, the oil is present in an amount from 5 to 70 weight percent, further from 5 to 60 weight percent, further from 5 to 50 weight percent, based on the weight of the composition.

In one embodiment, the oil is selected from the group consisting of nonaromatic oils, paraffinic oils, naphthenic oils, and combinations thereof. Suitable oils include, but are not limited to, SUNPAR 2280, PARALUX 6001, HYDROBRITE 550, and CALSOL 5550.

An oil may comprise a combination of two or more embodiments as described herein.

Additives

An inventive composition may comprise one or more additional additives. Suitable additives include, but are not limited to, fillers, antioxidants and antiozonants, UV stabilizers, flame retardants, colorants or pigments, and combinations thereof.

Fillers include, but are not limited to, carbon black, silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; natural fibers, synthetic fibers, and the like.

Some antioxidants and antiozonants include, but are not limited to, hindered phenols, bisphenols, and thiobisphenols; and substituted hydroquinones. Foaming agents, such as azodicarbonamide, can be used for making a foam structure.

In one embodiment, an inventive composition further comprises a thermoplastic polymer. Polymers, include, but not limited to, propylene-based polymers, ethylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

Applications

The compositions of the present invention may be used to prepare a variety of articles or manufacture, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes.

Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation.

Definitions

Unless stated to the contrary, implicit from the context, or customary in the art, all parts and percents are based on weight, and all test methods are current as of the filing date of this disclosure.

The term "composition," as used herein, includes the material(s), which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene-based polymer," as used herein, refers to a polymer that comprises, in polymerized form, a majority weight percent of ethylene (based on the weight of the polymer), and optionally may comprise one or more comonomers.

The term "ethylene-based interpolymer," as used herein, refers to a polymer that comprises, in polymerized form, a majority weight percent of ethylene (based on the weight of the interpolymer), and at least one comonomer.

The term "ethylene/α-olefin/nonconjugated polyene interpolymer," as used herein, refers to a polymer that comprises, in polymerized form, ethylene, an α-olefin, and a nonconjugated polyene. In one embodiment, the "ethylene/α-olefin/nonconjugated polyene interpolymer" comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene copolymer," as used herein, refers to a copolymer that comprises, in polymerized form, a majority amount of propylene monomer (based on the weight of the copolymer), and ethylene, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of " excludes from the scope of any succeeding recitation any other component, step or procedure, excepting those that are not essential to operability. The term "consisting of " excludes any component, step or procedure not specifically delineated or listed.

Test Methods
Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000 g/mole, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene} = A \times (M_{polystyrene})^B$, where M is the molecular weight, A has a value of 0.431 and B is equal to 1.0 (as described in Williams and Ward, *J. Polym. Sc., Polym. Let.*, 6, 621 (1968)). Polyethylene equivalent molecular weight calculations were performed using Viscotek TriSEC software Version 3.0.

FTIR Method for EPDM Composition Analysis

The terpolymers containing ethylene, propylene, and 5-ethylidene-2-norbornene were analyzed using ASTM D3900 for its ethylene content, and ASTM D6047 for its ethylidene-norbornene or dicyclopentadiene content.

13C NMR Method for EPDM Composition Analysis

The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000Hz and a file size of 32K data points. NMR spectral analysis of each composition of the examples was carried out using the following analysis method. Quantitation of monomers present in EPDM can be calculated using the following equations (1 through 9).

The calculation of moles ethylene normalizes the spectral range from 55.0 to 5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3*molesP - 7*molesENB)}{2} \quad \text{Equation 1}$$

$$molesENB = CH3(13.6 - 14.7 \text{ ppm}) \quad \text{Equation 2}$$

$$molesP = CH3(19.5 - 22.0 \text{ ppm}) \quad \text{Equation 3}$$

$$\text{mole \% ethylene} = \frac{100*molesE}{molesE + molesP + molesENB} \quad\text{Equation 4}$$

$$\text{mole \% propylene} = \frac{100*molesP}{molesE + molesP + molesENB} \quad\text{Equation 5}$$

$$\text{mole \% ENB} = \frac{100*molesENB}{molesE + molesP + molesENB} \quad\text{Equation 6}$$

$$\text{Wt \% ethylene} = \frac{100*\text{moles \% } E*28}{\text{mole \% } E*28 + \text{mole \% } P*42 + \text{mole \% } ENB*120} \quad\text{Equation 7}$$

$$\text{Wt \% propylene} = \frac{100*\text{mole \% } P*42}{\text{mole \% } E*28 + \text{mole \% } P*42 + \text{mole \% } ENB*120} \quad\text{Equation 8}$$

$$\text{Wt \% ENB} = \frac{100*\text{mole \% } ENB*120}{\text{mole \% } E*28 + \text{mole \% } P*42 + \text{mole \% } ENB*120} \quad\text{Equation 9}$$

Further NMR spectral analysis of the inventive EPDMs displayed a peak area from 21.3-21.8 ppm greater than 3.5% of the total integral area from 19.5 to 22.0 ppm. Similar spectral analysis of the comparative EPDMs showed less than 3.5% of the total integral area from 19.5 to 22.0 ppm. Spectral data were referenced to the EEE backbone at 30 ppm. Peak responses in this region typically are related to differences in propylene tacticity (% mm) that have been incorporated into the EPDM. A similar analysis can be done for another type of ethylene/α-olefin/nonconjugated polyene interpolymer.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes. The rheology ratio (V0.1/V100 at 190° C.; also referred to as "RR") was recorded. A linear molecule (no detectable long chain branching) typically has a RR of 8 or less.

Compression Set

Compression set was measured according to ASTM D395 at 23° C. and 100° C. Disks of 29 mm (±0.5 mm) in diameter and 12.7 mm (±0.5mm) thickness, were punched from compression molded plaques, prepared as described under the section for compression molding. Each button sample was inspected for notches, uneven thickness and inhomogeneity, and selected buttons (without those defects) were tested. Compression set was performed on two specimens for each sample, at the temperatures specified, and the average results of the two specimens was reported. The button sample was placed in the compression device having two metal plates that could be pressed together, and locked into place at 75% of the original height of the button sample. The compression device, with the compressed samples, was then placed in an oven, and equilibrated at the appropriate temperature for a specified time (22 hrs for 23° C. or 100° C.). In this test, the stress was released at the test temperature, and the thickness of the sample was measured after a 30 minute equilibration period at room temperature. Compression set is a measured of the degree of recovery of a sample following compression, and is calculated according to the equation CS=(H1−H2)/(H0−H1); where H0 is the original thickness of the sample, H1 is the thickness of the spacer bar used, and H2 is the final thickness of the sample after removal of the compressive force.

Tensile Stress—Strain Properties

Tensile properties were measured using specimens which were die cut, using a small "dog bone" shaped micro tensile die, having the dimensions described in ASTM D-1708. The die cut specimens were cut from the compression molded plaques, which were prepared as described under the Compression Molding section. Tensile properties (tensile strength and elongation) were measured at room temperature, following the method ASTM D-412, in the machine direction of an INSTRON MODEL 1122, made by INSTRU-MET.

Shore A Hardness

Sample specimens were cut from compression molded plaques, which were prepared as described in the compression molding section. Shore A hardness was measured per ASTM D2240, on a Shore A Durometer Model 2000, made by INSTRON, with a Durometer Stand Model 902. This method permits hardness measurements, based on either initial indentation, or indentation after a specific period of time, or both. As used herein, the indentation was measured at a specified time of ten seconds.

Compression Molded Plaques

The physical properties of the formulations were measured from plaques, cured in a compression molder (for tensile, compression set testing, C-tear, temperature retraction). The samples were compression molded, in accordance to ASTM D3182, using a PHI (100 ton press).

The desired mold (6 in.×6 in., or compression buttons) was placed on a platen. The sample (uncured blanket) was cut slightly smaller than the dimensions of the individual mold cavity. The mill direction was marked, and the sample was labeled. The mold was spray brushed with a dilute solution of silicone. The samples were in a preheated mold, taking care to place properly for mill direction. The platens were closed. The "normal" operating pressure was 100 tons, or as shown on the gauge as 200,000 pounds. When cure time ended, the bottom platen automatically opened. The samples were removed, and immediately placed in water to stop the curing. Samples were conditioned for 24 hours at room temperature, prior to testing. To vulcanize the samples, the samples were conditioned at 160° C. using t95 data plus three minutes for plaques, and using t95 data plus 15 minutes for compression set buttons.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000.

The viscosity of each formulated compositions was measured using an uncured blanket (see experimental section), so that the viscosity of the uncured composition could be examined. Samples were conditioned for 24 hours at room temperature, prior to testing.

Mooney Scorch

Scorch properties of each composition was measured in accordance to ASTM D-1646, using an Alpha Technologies Mooney Viscometer 2000. Mooney viscometer was set at 125° C. The Mooney scorch values were reported for a small rotor, and represented the time to rise "x Mooney units" above the minimum viscosity (e.g. $t_5$ is a "five Mooney unit" increase in viscosity). The total test time was 30 minutes, with a 1 minute preheat time. The viscosity of the compositions were measured from uncured blanket, cured in the viscometer, so that the scorch properties could be examined Samples were conditioned for 24 hours at room temperature, prior to testing.

MDR Analysis

MDR cure properties of each formulation were measured in accordance to ASTM D-3182, using an Alpha Technologies Rheometer MDR 2000. The MDR Test was carried out at 160° C. over a period of 30 minutes. The rheology of each formulated composition was measured from samples of uncured blanket, which was then cured during the MDR analysis. Samples were conditioned for 24 hours at room temperature, prior to testing. The visco-elastic properties, such as Mooney low, Mooney high, tan delta low, tan delta high, and time to reach a certain percentage of the cure state (for example, t95 corresponds to the time in minutes to reach the 95% state of cure), were measured during the cure cycle.

Temperature Retraction

The temperature retraction properties of the cured specimens were measured in accordance to ASTM D-1329. Retraction at Lower Temperatures using MODEL # TR-6 (BENZ Materials). This test method describes a temperature-retraction procedure for rapid evaluation of crystallization effects and for comparing visco-elastic properties of rubber and rubber-like materials at low temperatures. The initial specimen had dimensions of "48 mm by 120 mm by 2 mm," and was die cut according to the shape described in ASTM D-1329. This test method was carried out by elongating the specimen to 150%, locking specimen in the elongated condition, freezing specimen to a state of reduced elasticity (−45° C.), equilibrating the specimen for ten minutes, releasing the frozen specimen, and allowing specimen to retract freely, while raising the temperature at 1° c./min, measuring the length of the specimen at regular temperature intervals, while it is retracting, and computing the percentage retraction at these temperatures from the data obtained. In practice, the temperatures corresponding to 10% and 70% retraction are of particular importance, and are designated as TR10 and TR70, respectively.

C-Tear Testing

C-Tear properties were measured using specimens which were die cut, using a die, having the dimensions described in ASTM D-624. The die cut specimens were cut from the cured and compression molded plaques, which were prepared as described under the Compression Molding section. The specimens were conditioned at ASTM conditions (23+/−2° C. and 50% RH) for at least 16 hours, before they were died out and tested. Tear properties were measured, at room temperature, following the method ASTM D-624, and were measured in the mill direction using an INSTRON MODEL 1122, made by INSTRU-MET. The gauge length between the grips was set to be 50.8 mm, and the testing speed was carried out at 508 mm/min The average C tear strength was reported in N/mm.

EXPERIMENTAL

I. Representative Synthesis of Experimental EPDM Continuous Polymerization

The polymer products were produced in a solution polymerization process using a series of continuously mixed reactors; loop or continuous stir-tanked reactor configured in a single or dual reactor configuration. See also U.S. Pat. Nos. 5,977,251 and 6,545,088, and the references therein, for reactors and associated equipment and polymerization conditions.

Ethylene was introduced in a mixture of a solvent of ISOPAR E (a mixture of C8-C10 saturated hydrocarbons available from ExxonMobil), propylene and 5-ethylidene-2-norbornene (ENB), forming the reactor feed streams. Catalyst was fed individually to each reactor separately, and activated in-situ using co-catalyst 1 and co-catalyst 2. The outlet of each reactor was consequently a mixture of polymer, solvent, and reduced levels of the initial monomer streams; outlet of the first reactor was fed directly into the second reactor (unless otherwise sampled). The molecular weight of the polymer may be controlled by adjusting each reactor's temperature, monomer conversion and/or the addition of a chain terminating agent such as hydrogen. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent formation of a vapor phase.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate.

Tables 1A and 1B outline the reaction conditions used to produce some the inventive examples. EPDM01 was prepared using two consecutive loop reactors (first reactor: loop;

second (final) reactor: loop). EPDM02 and EPDM03 were each prepared using a loop reactor followed by a continuous stirred-tank reactor (first reactor: loop; second (final) reactor: CSTR). Examples designated with "R1" are of the materials sampled from the first reactor and are representative of the polymer composition that is fed to the second reactor. Polymer properties are shown in Tables 2. Comparative resins are shown in Table 3.

TABLE 1A

Reaction Conditions for Experimental EPDM

| Ex. | H2 Mol % | C2 Conc. [g/L] | Catalyst Efficiency [lb_poly/ lb_metal] *10E6 | Catalyst Flow* [lb/hr] | Catalyst Solution Conc. (ppm) | Cocat-1** Flow [lb/hr] | Cocat-1 Solution Conc. ppm | Cocat-2*** Flow [lb/hr] | Cocat-2 Solution Conc. [ppm] | Production Rate [lb/hr] |
|---|---|---|---|---|---|---|---|---|---|---|
| EPDM01-R1 | 0.25 | 2.58 | 0.49 | 5.8 | 36,500 | 14.6 | 20,800 | 47 | 16,000 | 12,220 |
| EPDM01 | 1.15 | 1.90 | 0.71 | 5.7 | 36,500 | 14.6 | 20,800 | 47 | 16,000 | 18,480 |
| EPDM02-R1 | 0.34 | 19.68 | 0.27 | 1.06 | 99.98 | 1.23 | 1099.6 | 0.92 | 498.0 | 20.1 |
| EPDM02 | 1.61 | 12.61 | 0.35 | 0.56 | 99.98 | 0.67 | 1099.6 | 0.50 | 498.0 | 19.4 |
| EPDM03-R1 | 0.47 | 19.68 | 0.21 | 1.09 | 99.98 | 1.32 | 1078.7 | 0.99 | 480.7 | 22.9 |
| EPDM03 | 0.69 | 12.40 | 0.39 | 0.62 | 99.98 | 0.75 | 1099.6 | 0.63 | 498.0 | 23.9 |

*Catalyst is [[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafnium dimethyl.
**Cocatalyst-1 was a mixture of methyldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[B(C6F5)4], substantially as disclosed in U.S. Pat. No. 5,919,988 (Ex. 2). Cocatalyst-1 was purchased from Boulder Scientific, and used without further purification.
***Cocatalyst-2 (modified methylalumoxane (MMAO)) was purchased from Akzo Nobel, and used without further purification.

TABLE 1B

Reaction Conditions for Experimental EPDM

| Example | Reactor Volume, [gal] | Reactor Temp. [deg C.] | Pressure [psig] | Solvent Feed [lb/hr] | Ethylene Feed [lb/hr] | Propylene Feed [lb/hr] | ENB Feed [lb/hr] |
|---|---|---|---|---|---|---|---|
| EPDM01-R1 (first reactor) | 5200 | 147.0 | 650 | 73,800 | 10,840 | 7,930 | 1,670 |
| EPDM01 (second reactor) | 5200 | 175.0 | 650 | 53,900 | 12,640 | 7,480 | 1,000 |
| EPDM02-R1 (first reactor) | 26 | 89.8 | 610 | 141.4 | 14.8 | 21.0 | 4.6 |
| EPDM02 (second reactor) | 27 | 138.4 | 603 | 49.3 | 10.0 | 15.1 | 1.4 |
| EPDM03-R1 (first reactor) | 26 | 89.8 | 610 | 159.1 | 16.7 | 23.7 | 5.2 |
| EPDM03 (second reactor) | 27 | 131.1 | 605 | 59.1 | 11.3 | 21.5 | 0.92 |

TABLE 2

Properties of Experimental EPDM Compositions

| | | Units | EPDM01 First reactor | EPDM01 Second reactor (final polymer composition) | EPDM02 Second reactor (final polymer composition) | EPDM03 Second reactor (final polymer composition) |
|---|---|---|---|---|---|---|
| First Composition | % C2 | | 70.1 | 71.0 | 50.2 | 49.1 |
| | % C3 | | | | 44.7 | 46.1 |
| | % ENB | | 5.1 | 5.0 | 5.08 | 4.8 |
| Amt of first reactor component | wt %* | | 40 | | | |
| MOONEY | ML (1 + 4) 125° C. | MU | 40.5 | 21.5 | 76 | 73.9 |
| CONV. GPC | Mn | g/mol | 65660 | 36870 | 96405 | 95573 |
| | Mw | g/mol | 144310 | 99290 | 205209 | 201410 |
| | Mz | g/mol | 269500 | 229100 | 371262 | 368251 |
| | Mw/Mn | | 2.20 | 2.69 | 2.13 | 2.11 |
| Viscosity at 0.1 rad/s | V (0.1 190° C.) | Pa-s | 145560 | 58749 | 108410 | 99042 |
| Viscosity at 100 rad/s | V (100 190° C.) | Pa-s | 2223 | 1557 | 3689 | 3787 |
| Rheology Ratio | RR (V0.1/V100) | | 65.5 | 37.7 | 29.4 | 26.2 |
| Tan Delta at 0.1 rad/s | TD (0.1 190° C.) | | 0.79 | 1.27 | 1.45 | 1.58 |

TABLE 2-continued

Properties of Experimental EPDM Compositions

|  |  |  | EPDM01 | EPDM02 | EPDM03 |
|---|---|---|---|---|---|
|  |  | Units | First reactor | Second reactor (final polymer composition) | Second reactor (final polymer composition) | Second reactor (final polymer composition) |
| Tan Delta at 100 rad/s | TD (100 190° C.) |  | 0.64 | 0.75 | 0.48 | 0.49 |
| 13C NMR % Peak Area 21.3-21.8 ppm |  |  | >3.5 | >3.5 | 18.2 | 18.8 |

*Based on weight of second (final) reactor product.

TABLE 3

Property Data for Comparative Compositions

|  |  |  | EPDM25 | EPDM70 |
|---|---|---|---|---|
| First composition |  | Units | First reactor | Second reactor (final polymer composition) | Second reactor (final polymer composition) |
|  | % C2 |  |  | 71 | 71 | 50 |
|  | % C3 |  |  |  |  |  |
|  | % ENB |  |  | 4.7 | 4.7 | 4.5 |
| Amount of first reactor component | wt %* |  | 40 |  |  |
| Polymer MOONEY* | ML (1 + 4) 125° C. | MU | 98 | 26 | 70 |
| CONV. GPC | Mn | g/mol | 73340 | 33630 | 74250 |
|  | Mw | g/mol | 197330 | 115040 | 177060 |
|  | Mz | g/mol | 392100 | 304200 | 339700 |
|  | Mw/Mn |  | 2.69 | 3.4 | 2.38 |
| Viscosity at 0.1 rad/s | V (0.1, 190° C.) | Pa-s | 191000 | 30574 | 108000 |
| Viscosity at 100 rad/s | V (100, 190° C.) | Pa-s | 4927 | 1911 | 3805.6 |
| Rheology Ratio | RR V0.1/V100 |  | 38 | 16.0 | 28.4 |
| Tan Delta at 0.1 rad/s | TD (0.1, 190° C.) |  | 1.0 | 2.0 | 1.35 |
| Tan Delta at 100 rad/s | TD (100, 190° C.) |  | 0.51 | 0.8421 | 0.55 |
| 13C NMR % Peak Area 21.3-21.8 ppm |  | % | 2 | 2 | 3.5 |

*Based on weight of second (final) reactor product.

Each formulation for cure, contained sulfur, accelerators, carbon black, zinc oxide, oil, as shown below in Table 4.

TABLE 4

Amounts in PHR, based on weight of First Composition

| First Composition | 100 |
|---|---|
| Zinc Oxide | 5 |
| Stearic Acid | 1 |
| FEF (ASTM - N550) Black | 80 |
| SUNPAR 2280 | 50 |
| Butyl Zimate (ZnDBC) | 2 |
| MBT | 1 |
| TMTD | 0.5 |
| Sulfur | 1.5 |

Each formulation was shear mixed in a BANBURY mixer (starting from room temperature), and then milled into flat blankets using a roll-mill The formulation was mixed using a Farrel BR Banbury Mixer (1.5 L volume) using an upside down mixing method. The polymer was weighed in with the sulfur and other dry ingredients, and fluxed at a slow-speed for 2.5 minutes, at 66° C. (150° F.); the accelerator was added, and then the mixture was further fluxed, and then dropped at 99° C. (210° F.). A 6" Reliable Roll Mill was then used to complete the mixing and to mill an uncured blanket. Blowing agents can be added to produce sponge products. Different and additional cross-linking agents, such as peroxides, can be used.

Samples from the uncured blankets were heated and cured in a compression molder (see Test Method section), and the properties tested on the cured specimen. Samples from the uncured blankets were heated in a rheometer (see Test Method section), and the curing rates of the samples were examined. Properties are shown in Tables 5 and 6.

TABLE 5

Properties after Cross-linking

| Composition |  | Comp. A | Comp. B | Inv. 1 | Inv. 2 | Inv. 3 |
|---|---|---|---|---|---|---|
| First Composition |  | EPDM25 | EPDM70 | EPDM01 | EPDM02 | EPDM03 |
| Mooney* (ML 1 + 4, 125 C.) | Mu | 29.9 | 69.7 | 27.2 | 70.1 | 70.6 |

TABLE 5-continued

Properties after Cross-linking

| Composition |  | Comp. A | Comp. B | Inv. 1 | Inv. 2 | Inv. 3 |
|---|---|---|---|---|---|---|
| Shore A | ShA | 73 | 65 | 70 | 63 | 62 |
| Tensile Modulus | MPa | 4.0 | 4.0 | 3.5 | 4.0 | 4.0 |
| Stress @ Break | MPa | 15.2 | 11.18 | 13.0 | 9.93 | 10.22 |
| Strain @ Break | % | 513 | 312 | 486 | 282 | 293 |
| C-Tear | N/mm | 39.8 | 31.3 | 35.75 | 24.66 | 24.75 |
| Compression Set, 23° C. | % | 33 | 5 | 28 | 6 | 8 |
| Compression Set, 100° C. | % | 38 | 19 | 35 | 20 | 20 |
| Temperature Retraction |  |  |  |  |  |  |
| TR10 | ° C. |  | −43.15 |  | −44.75 | −43.4 |
| TR70 | ° C. |  | −32.1 |  | −32.85 | −33.35 |
| TR70 − TR10 | ° C. |  | 11.04 |  | 11.9 | 10.02 |

TABLE 6

Rheological Properties

| Composition |  |  | Comp. A | Comp. B | Inv. 1 | Inv. 2 | Inv. 3 |
|---|---|---|---|---|---|---|---|
| First Composition |  |  | EPDM25 | EPDM70 | EPDM01 | EPDM02 | EPDM03 |
| MDR |  | Norm |  |  |  |  |  |
| Test temp | [C.] | = | 200 | 200 | 200 | 200 | 200 |
| Test time | [min] | = | 12 | 12 | 12 | 12 | 12 |
| ML | [dNm] | : | 0.74 | 1.72 | 0.65 | 1.85 | 1.81 |
| MH | [dNm] | : | 17.82 | 19.64 | 18.49 | 17.54 | 18.42 |
| MH − ML | [dNm] | : | 17.08 | 17.92 | 17.84 | 15.69 | 16.61 |
| ts1 | [min] | : | 1.31 | 1.09 | 1.37 | 1.02 | 1.05 |
| ts2 | [min] | : | 1.52 | 1.27 | 1.62 | 1.2 | 1.23 |
| t10 | [min] | : | 1.46 | 1.24 | 1.57 | 1.13 | 1.18 |
| t50 | [min] | : | 3.74 | 2.99 | 4.41 | 2.78 | 2.99 |
| t90 | [min] | : | 14.48 | 15.81 | 14.23 | 15.27 | 15.47 |
| t95 | [min] | : | 19.28 | 20.87 | 18.61 | 20.62 | 20.51 |
| TanD@ML |  |  | 1.162 | 1.000 | 1.169 | 0.908 | 0.945 |
| TanD@MH |  |  | 0.139 | 0.147 | 0.071 | 0.146 | 0.128 |
| Mooney Scorch |  |  |  |  |  |  |  |
| Mm (min) | [MU] |  | 10.9 | 25.3 | 10 | 26.3 | 26.4 |
| MH (max) | [MU] |  | 29 | 43.6 | 28.2 | 44.5 | 44.4 |
| MH − Mm | [MU] |  | 18.1 | 18.3 | 18.2 | 18.2 | 18 |
| t3 | [M · m] |  | 11.4 | 8.6 | 12.7 | 7.9 | 8.4 |
| t5 | [M · m] |  | 12.5 | 9.6 | 13.9 | 8.8 | 9.3 |
| t10 | [M · m] |  | 14 | 11 | 15.5 | 10.0 | 10.6 |

FIG. 1 depicts a plot of "13C NMR % Peak Area" versus "weight percent C2" for several inventive (first composition) and comparative compositions. For this figure, the comparative compositions are listed in Table 7, and the inventive compositions are listed in Table 8. The increased tacticity is a result of the catalyst and process, and the specific polymer that is produced. As shown in FIG. 1, for the inventive compositions, the % mm tacticity increases with decreasing ethylene content in the polymer.

TABLE 7

13C NMR Data for Comparative Examples

| Description | % C2 | % ENB | 13C NMR % Peak Area (21.3-21.8 ppm) |
|---|---|---|---|
| NORDEL IP 5565 | 46.5 | 7.8 | 3.0 |
| NORDEL 4725 | 70.7 | 4.6 | 2.0 |
| VISTALON 8800* | 50.4 | 8.6 | 1.2 |
| KELTAN 7341A* | 56.8 | 5.0 | 1.1 |
| VISTALON 3666* | 67.5 | 2.7 | 2.4 |
| KELTAN 4903* | 52.0 | 9.0 | 0.4 |
| ROYALENE 525* | 52.0 | 7.7 | 0.9 |
| VISTALON 8600* | 76.0 | 3.3 | 0.5 |
| MITSUI EPT M9090** | 44.2 | 10.4 | 3.2 |

TABLE 7-continued

13C NMR Data for Comparative Examples

| Description | % C2 | % ENB | 13C NMR % Peak Area (21.3-21.8 ppm) |
|---|---|---|---|
| VISTALON 7602** | 67.6 | 3.4 | 1.4 |
| MITSUI 3092** | 54.0 | 4.0 | 0.6 |
| VISTALON 6602** | 52.3 | 7.0 | 1.4 |
| KELTAN 8270** | 51.0 | 2.6 | 1.3 |

*Prepared with a Vanadium Ziegler-Natta.
**Prepared with metallocene (e.g., bis-metallocene).

TABLE 8

13C NMR Data for Inventive Examples

| Description | wt % C2 (NMR) | wt % ENB (NMR) | 13C NMR % Peak Area (21.3-21.8 ppm) |
|---|---|---|---|
| EPDMZ01 | 48.5 | 8.7 | 16.4 |
| EPDMZ02 | 47.6 | 7.9 | 17.0 |
| EPDMZ03 | 52.8 | 7.1 | 16.7 |
| EPDMZ04 | 52.5 | 6.6 | 17.9 |
| EPDMZ05 | 47.8 | 8.6 | 16.6 |

TABLE 8-continued

13C NMR Data for Inventive Examples

| Description | wt % C2 (NMR) | wt % ENB (NMR) | 13C NMR % Peak Area (21.3-21.8 ppm) |
|---|---|---|---|
| EPDMZ06 | 49.6 | 8.0 | 18.7 |
| EPDMZ07 | 48.0 | 7.8 | 23.2 |
| EPDMZ08 | 52.0 | 7.6 | 17.3 |
| EPDMZ09 | 51.3 | 7.1 | 18.3 |
| EPDMZ10 | 55.6 | 7.1 | 14.6 |
| EPDMZ11 | 66.3 | 5.8 | 8.0 |
| EPDMZ12 | 66.3 | 5.8 | 8.0 |
| EPDMZ13 | 57.1 | 3.7 | 16.0 |
| EPDMZ14 | 54.4 | 4.5 | 16.0 |
| EPDMZ15 | 58.7 | 3.8 | 13.0 |
| EPDMZ16 | 69.5 | 3.5 | 7.0 |
| EPDMZ17 | 70.6 | 5.0 | 7.0 |
| EPDMZ18 | 69.1 | 4.7 | 6.0 |

It has been discovered that the inventive compositions have high levels of % mm tacticity. The comparative compositions, and those produced from other commercial processes and catalysts, do not exhibit this same feature. It is believed that the high levels of % mm tacticity lead to additional sequences of propylene that are adjoined to each other within the polymer backbone. At the same level of crystallinity and Mooney Viscosity of an EPDM, it is believed that this higher tacticity level increases the compatibility of the components of a rubber formulation. Increased compatibility with the oils, fillers, curatives, and other polymers, allows for improved dispersion of the formulation components, resulting in smoother surfaces of extruded, molded, rolled, or calendared articles, and less imperfections and defects due to undispersed components. Improved dispersion allows for shorter mixing times; shorter mixing times allow for simpler mixing equipment, which can be used to achieve the degree of dispersion necessary for typical applications.

The examples show that the incorporation of this "% mm tacticity" in the polymer does not adversely affect the properties of a formulated rubber. When comparing compositions containing around 70 wt % of ethylene (C2), the respective inventive composition containing EPDM01 had similar cure properties and physical properties as the composition containing EPDM25. Also, when comparing compositions containing around 50 wt % of ethylene (C2), the respective inventive compositions containing EPDM02 and EPDM03 had similar cure properties and physical properties as the composition containing EPDM70.

The dispersion and mixing of the polymer also is a function of the rheology of the polymer, as indicated by the low shear viscosity at 0.1 (rad/s) and the rheology ratio (V0.1 (viscosity at 0.1 rad/s)/V100 (viscosity at 100 rad/s)). In some embodiments, high rheology ratios are preferred because they give rise to lower viscosity as the shear conditions in the mixture increase. Compared to the first reactor polymer of the first composition of EPDM25 (first reactor), it was observed the EPDM01-R1 (first reactor) polymer had a higher rheology ratio. EPDM25 (first reactor) had a rheology ratio of 38, while EPDM01-R1 (first reactor) had a rheology ratio of 65.5. Also, EPDM25 (final polymer composition) had a rheology ratio of 16.0, while EPDM01 (final polymer composition) had a rheology ratio of 37.7.

In some embodiments, a lower tan delta, at 0.1 rad/s, is preferred, because it gives rise to higher melt elasticity at low shear rates. During the initial stages of mixing, the high melt elasticity of the polymer can aid in the break-up and dispersion of other components, by acting as a shear promoter that helps maintain a high viscosity, until the stresses are reduced from the melting and dispersion of the polymer. EPDM25 has a tan delta, at 0.1 rad/s, of 2.0, while the tan delta, at 0.1 rad/s, for EPDM01 is 1.27. Compared to EPDM25 (first reactor), EPDM01-R1(first reactor) and has a lower tan delta, at 0.1 rad/s. First reactor polymer from EPDM25 had a tan delta, at 0.1 rad/s, of 1.0, while the tan delta, at 0.1 rad/s, for EPDM01-R1 is 0.79.

The viscosity and rheological features, along with the "% mm tacticity," provide a unique viscosity and component compatibility that results in a polymer composition that is easily dispersed in a rubber compound. Such features are important for obtaining fine dispersion of the components added to a rubber formulation, such as carbon black, oils, curatives, talc, calcium carbonate, and other additives. Benefits are expected in the rubber mixing operations and in the processing of final articles, such as extruded profiles, injection molded articles, rolled and calendared articles.

The invention claimed is:

1. A composition comprising a first composition that comprises at least one EPDM; and
   wherein the first composition has a Mooney Viscosity (ML1+4, 125° C.) greater than, or equal to, 10, and
   wherein the first composition has a "13C NMR % Peak Area," which is the {[(13C NMR peak area from 21.3 ppm to 21.8 ppm) divided by the (total integral area from 19.5ppm to 22.0 ppm)] ×100}, that is greater than 10.0 percent, as determined by 13C NMR; and
   wherein the first composition meets the following relationship: 13C NMR % Peak Area ≥−0.40(C2) +33%,
   wherein the "13C NMR % Peak Area" is the {[(13C NMR peak area from 21.3 ppm to 21.8 ppm) divided by the (total integral area from 19.5 ppm to 22.0 ppm)]× 100}, as determined by 13C NMR, and
   the "C2" is the weight percent of polymerized ethylene in the first composition, based on the weight of the first composition.

2. The composition of any of claim 1, wherein the EPDM has a rheology ratio (V0.1/V100 at 190° C.) greater than, or equal to, 20.

3. The composition of claim 1, wherein the EPDM has a rheology ratio from 20 to 80.

4. The composition of claim 1, wherein the first composition comprises two EPDMs.

5. The composition of claim 1, wherein the first composition comprises from 40 to 80 weight percent ethylene, based on the weight of first composition.

6. The composition of claim 1, wherein the first composition comprises from 0.5 to 10 weight percent of the polyene, based on the weight of first composition.

7. The composition of claim 1, wherein the first composition has a viscosity at 0.1 rad/sec, 190° C., greater than, or equal to, 40,000 Pa·s.

8. The composition of claim 1, wherein the first composition has a Mooney Viscosity greater than, or equal to, 20 (ML 1+4, 125° C.).

9. The composition of claim 1, wherein the EPDM has a MWD less than, or equal to, 4.0.

10. The composition of claim 1, wherein the first composition has a MWD less than, or equal to, 4.0.

11. The composition of claim 1, wherein the composition further comprises a crosslinking agent.

12. A crosslinked composition formed from the composition of claim 1.

13. An article comprising at least one component formed from the composition of claim 1.

14. The article of claim 13, wherein the article is selected from the group consisting of profiles, injection molded parts, gaskets, automotive parts, building and construction materials, shoe components, and tubes.

15. The composition of claim 1, wherein the first composition has a "13C NMR % Peak Area," which is the {[(13C NMR peak area from 21.3 ppm to 21.8ppm) divided by the (total integral area from 19.5 ppm to 22.0 ppm)] ×100}, that is greater than, or equal to, 16.0 percent, as determined by 13C NMR.

16. The composition of claim 15, wherein the first composition has a weight average molecular weight (Mw) from 70,000 to 250,000 g/mole.

17. A composition comprising a first composition that comprises at least one EPDM; and
- wherein the first composition has a Mooney Viscosity (ML1+4, 125° C.) greater than, or equal to, 10, and a molecular weight distribution (MWD) from 2.0 to 3.0; and
- wherein the first composition has a "13C NMR % Peak Area," which is the {[(13C NMR peak area from 21.3 ppm to 21.8 ppm) divided by the (total integral area from 19.5ppm to 22.0 ppm)] ×100}, that is greater than 5.0 percent, as determined by 13C NMR; and
- wherein the first composition meets the following relationship: 13C NMR % Peak Area ≥−0.40(C2) +33%,
- wherein the "13C NMR % Peak Area" is the {[(13C NMR peak area from 21.3 ppm to 21.8 ppm) divided by the (total integral area from 19.5 ppm to 22.0 ppm)] ×100}, as determined by 13C NMR, and
- the "C2" is the weight percent of polymerized ethylene in the first composition, based on the weight of the first composition.

* * * * *